Patented June 2, 1931

1,808,722

UNITED STATES PATENT OFFICE

ALBERT HEMPEL, OF LEIPZIG-OETZSCH, GERMANY

MANUFACTURE OF PHENOLATES

No Drawing. Application filed July 7, 1930, Serial No. 466,034, and in Germany April 9, 1929.

This invention relates to the manufacture of alkali phenates according to which aromatic sulfonates are fused with caustic soda and the resulting mixture of sodium sulphite and sodium phenate is separated by physical means to obtain a phenate product which is remarkably free of sodium sulphite and other impurities, and which may be employed directly in subsequent syntheses.

Large quantities of phenol are employed in organic syntheses in the form of sodium salt, namely sodium phenate. For this purpose it has been customary heretofore to prepare the sodium phenate from the free phenol. However, since phenol is manufactured synthetically by fusing a benzene sulfonate with caustic soda whereby sodium phenate is formed, from which free phenol is thereafter liberated by means of an acid, it is apparent that the prior practice is repetitious and wasteful. Nevertheless, this procedure has been considered essential to the production of a satisfactory product.

I have now discovered that one may obtain practically pure sodium phenate directly from a fusion mass by permitting the charge to stratify whereby sodium phenate forms a distinct upper layer and the sodium sulphite, which carries with it impurities such as sodium sulphate, forms a distinct lower layer. Inasmuch as it is desirable to employ a slight excess of caustic in the fusion, the excess caustic may, advantageously, be neutralized first, by the addition of phenol to the charge. I have further observed that the separation may be made more accurately by admixing a quantity of sodium phenate with the charge, such as may be obtained from a previous batch.

The object of this invention, therefore, is to afford a method of manufacturing high grade technical sodium phenate directly and while obviating the customary steps of liberating the phenol and subsequently reforming the phenate.

An additional object of the invention is to provide a process for the manufacture of sodium phenate directly from the corresponding aromatic sulfonate whereby a product is obtained which is free from sodium sulphite, excess caustic, sodium sulphate, tars, etc., and which may be used successfully in subsequent organic syntheses that require phenol in the form of its sodium salt.

In general for the purpose of this present invention, the fusion of the aromatic sulfonates, such for example, as benzene sulfonate, with the caustic soda may follow the present day practice. After the fusion is complete, the mixture will be found to consist essentially of sodium sulphite, sodium phenate, a small amount of caustic soda which represents the excess employed in the fusion and impurities such as sodium sulphate, tars, oxidation products, etc. Upon completion of the fusion and while maintaining the charge in a molten condition, sufficient phenol is added to react with the excess caustic soda. Thereafter, the charge is permitted to settle or stratify, sodium phenate being of relatively lower specific gravity forms an upper layer that is distinct from the sodium sulphite which forms the lower layer. Following the separation, the two layers are isolated from each other as by decantation, or in any other suitable manner. An intermediate layer, which consists of a mixture of sodium sulphite and sodium phenate, may be separated in a subsequent cycle of operation. The sodium phenate so obtained will be found to be remarkably free of sodium sulphite, oxidation products, sodium sulphate and other impurities, and may be employed directly in organic syntheses where a technical grade of sodium sulphite is required, as for example, in the manufacture of salicylic acid.

A specific example of an application of the principles of my invention follows:

A charge consisting of 235 parts of sodium benzene sulfonate (85%, being the equivalent of 200 parts 100% sodium benzene sulfonate) and 112 parts of caustic soda (95%) are fused in the usual manner at a temperature of 300–340° C. for a period of time which will vary from four to eight hours, depending upon the technics of fusion employed. The charge is agitated during the fusion which may advantageously be performed at sub-atmospheric pressure and in the absence of an oxidizing atmosphere. After the fusion is complete, it will be found to contain seventeen to eighteen parts of free caustic soda, which is reacted by adding 41.5–42 parts of phenol. Thereafter the operation of the agitating mechanism is interrupted and the fluid mixture permitted to settle into two layers, the upper layer consisting of approximately 168 parts of sodium phenate and the lower layer consisting of approximately 127 parts of sodium sulphite and various impurities.

In order to hasten the settling operation and to obtain a sharper separation one may advantageously admix a small amount of sodium phenate such as has been obtained from the previous charge. If the line of demarcation between the two layers is not sharp or accurate for any reason, one may separate the stratified charge into three parts, one part consisting of the upper phenate layer, another part consisting of the lower sodium sulphite layer and the third part consisting of an intermediate layer which may be reworked in a subsequent cycle. The phenate product will be found to be well suited for the manufacture of salicylic acid.

The present application pertains specifically to the feature which involves the separation of a technical grade of sodium phenate without liberating and reforming the sodium salt as has been customary heretofore. The feature described hereinabove which involves effecting the fusion under reduced pressures and advantageously in the presence of an inert gaseous medium is claimed in my copending application, Serial Number 466,033 filed of even date. It is to be noted that while the principles of the invention set forth hereinabove are described in connection with the manufacture of phenol ($C_6H_5OH$), the principles are equally applicable to the manufacture of other phenols made from corresponding aromatic sulfonates, and include hydroxybenzoic acids, resorcinol, naphthols, alizarin, cresotinic acid, hydroxynaphthoic acids and similar compounds, and further that one may substitute potassium hydroxide or mixtures of potassium hydroxide and sodium hydroxide for the caustic soda (sodium hydroxide) specified hereinabove. Obviously, the invention is not limited to the specific disclosures, but contemplates broadly the manufacture and direct isolation of a technical grade of alkali metal phenates by the fusion of corresponding sulfonates with an alkali wherefrom the phenate is obtained by stratification and physical separation.

What I claim is:

1. The method which comprises fusing an aryl sulfonate with an alkali whereby there is obtained a mixture containing an alkali metal phenate corresponding to the aryl sulfonate, alkali sulfite and unreacted alkali, neutralizing the unreacted alkali by the addition of a phenol corresponding to the alkali metal phenate and subsequently allowing the phenate to stratify into a distinct separable layer and finally isolating the stratified phenate.

2. The method of manufacturing sodium phenate which consists in fusing sodium benzene sulphonate with caustic soda, permitting the fused mixture to form into physically separable layers and finally isolating the sodium phenate layer.

3. The method of manufacturing sodium phenate which consists in fusing sodium benzene sulphonate with caustic soda, adding phenol to the fused mixture in an amount sufficient to neutralize the unreacted alkali, permitting the mixture to form into physically separable layers of sodium phenate and sodium sulfite and finally isolating the sodium phenate layer.

4. The method which consists in fusing an aryl sulfonate with an alkali whereby a mixture of alkali metal sulfite, unreacted alkali and an alkali metal phenate corresponding to the aryl sulfonate is obtained, neutralizing the unreacted alkali by means of a phenol corresponding to the phenate, adding a quantity of the alkali metal phenate and thereafter permitting the fluid mixture to stratify and finally isolating the stratified phenate layer.

In testimony whereof, I affix my signature.

ALBERT HEMPEL.